Feb. 14, 1939.  G. A. LYON  2,147,049
SPARE WHEEL AND COVER ASSEMBLY
Original Filed Nov. 1, 1933   6 Sheets-Sheet 1
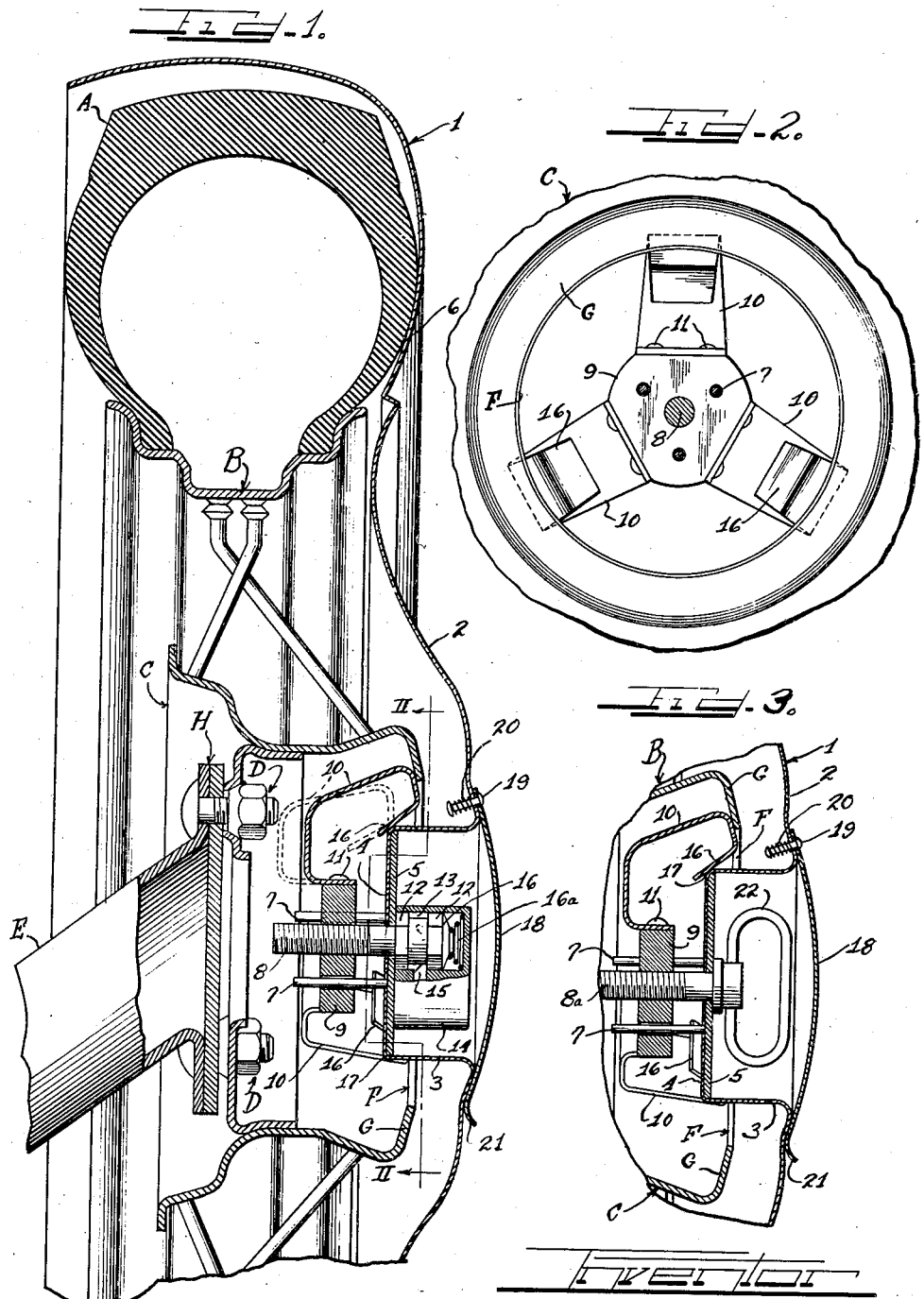
Inventor
George Albert Lyon.
by Charles O'Neill Attys.

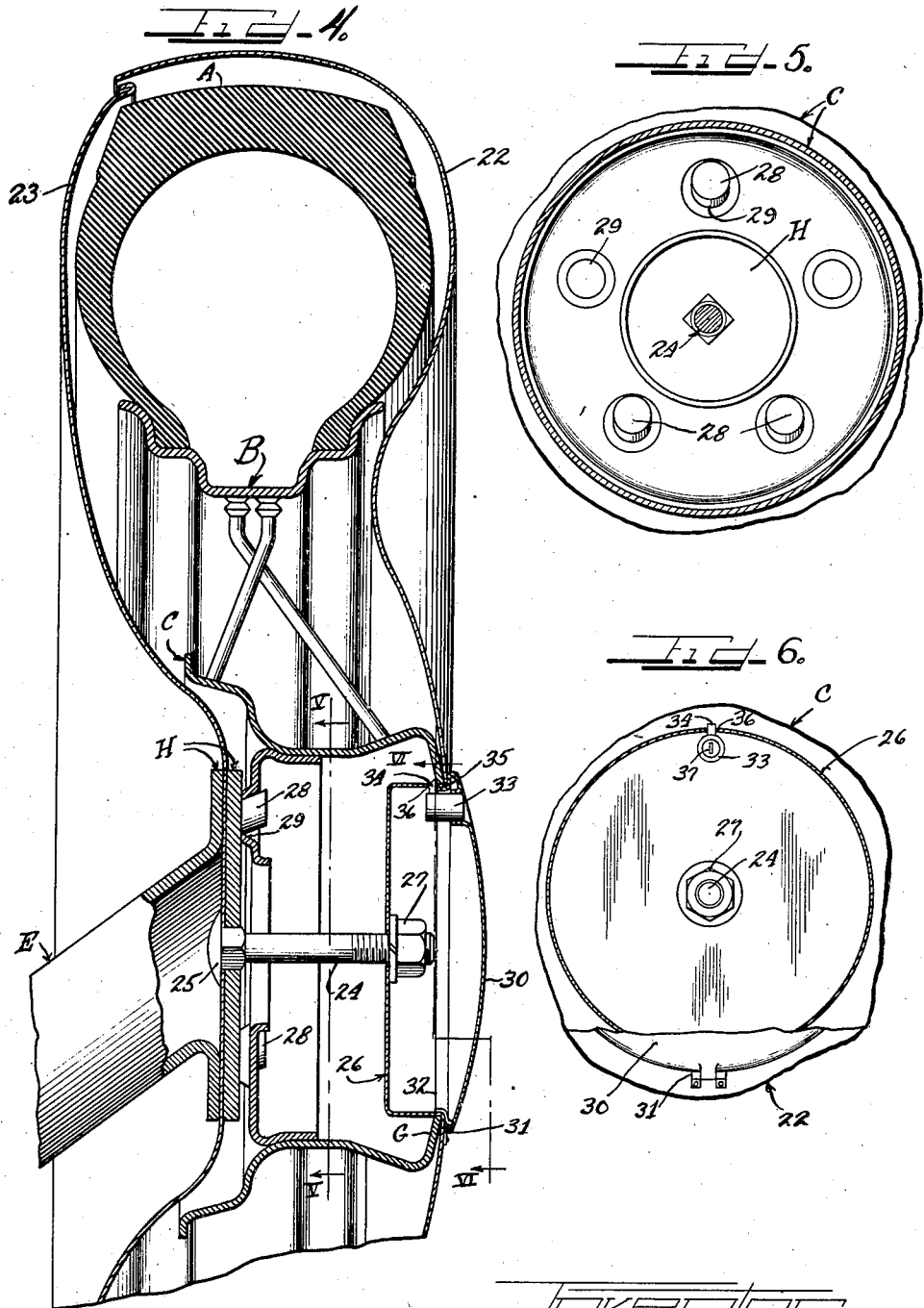

Feb. 14, 1939.  G. A. LYON  2,147,049
SPARE WHEEL AND COVER ASSEMBLY
Original Filed Nov. 1, 1933   6 Sheets-Sheet 3
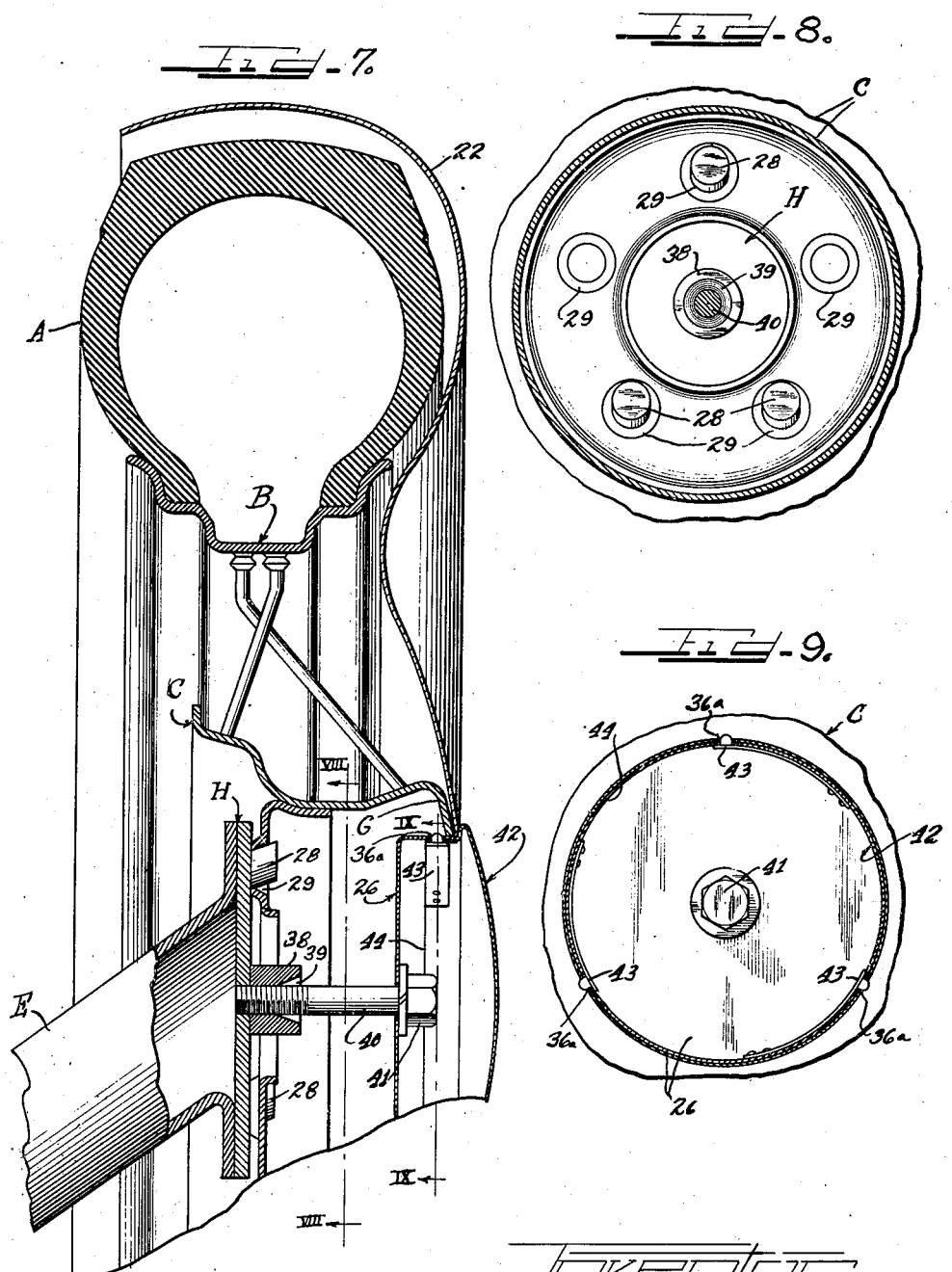
George Albert Lyon.

Feb. 14, 1939.  G. A. LYON  2,147,049
SPARE WHEEL AND COVER ASSEMBLY
Original Filed Nov. 1, 1933  6 Sheets-Sheet 4
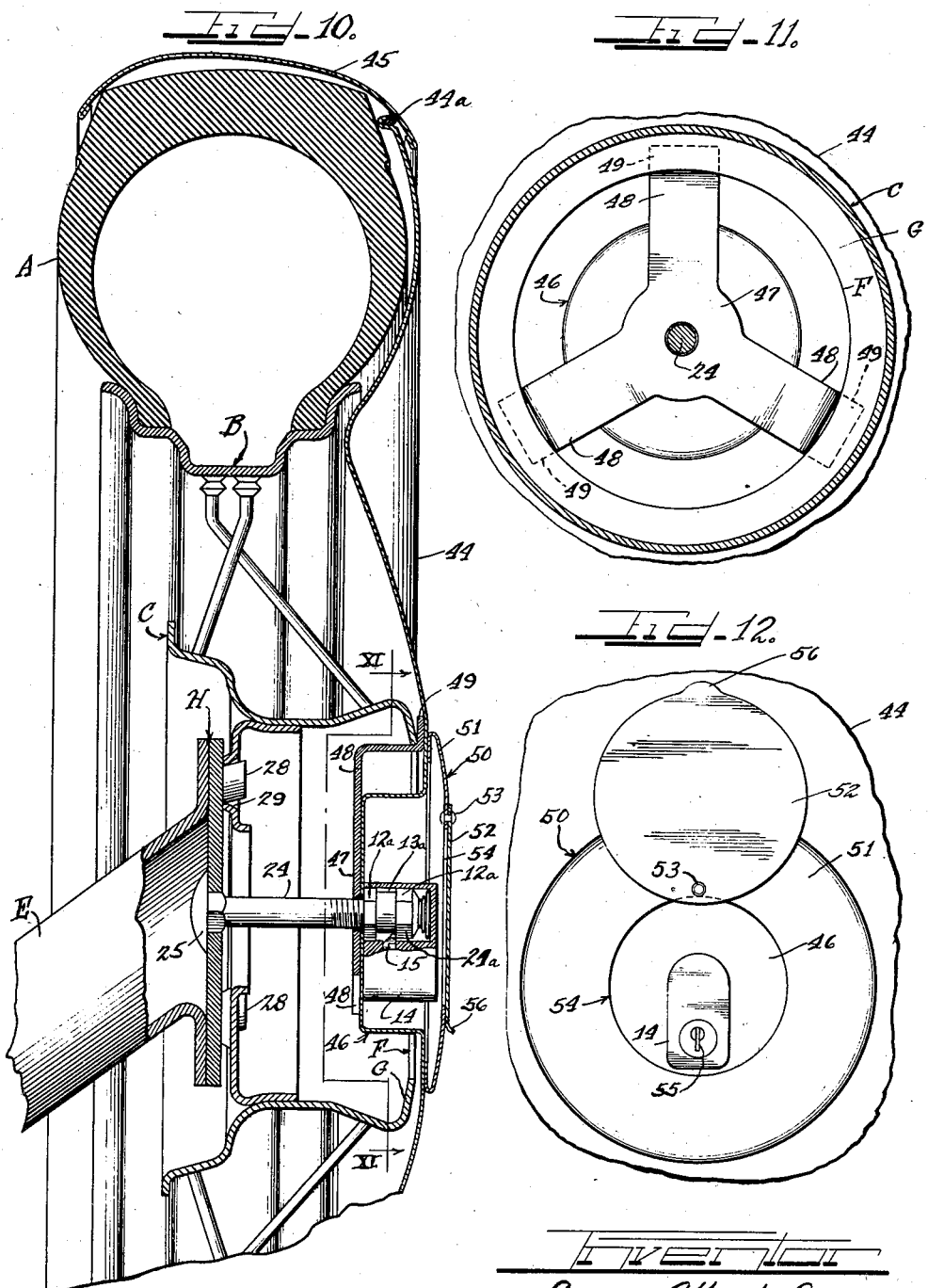

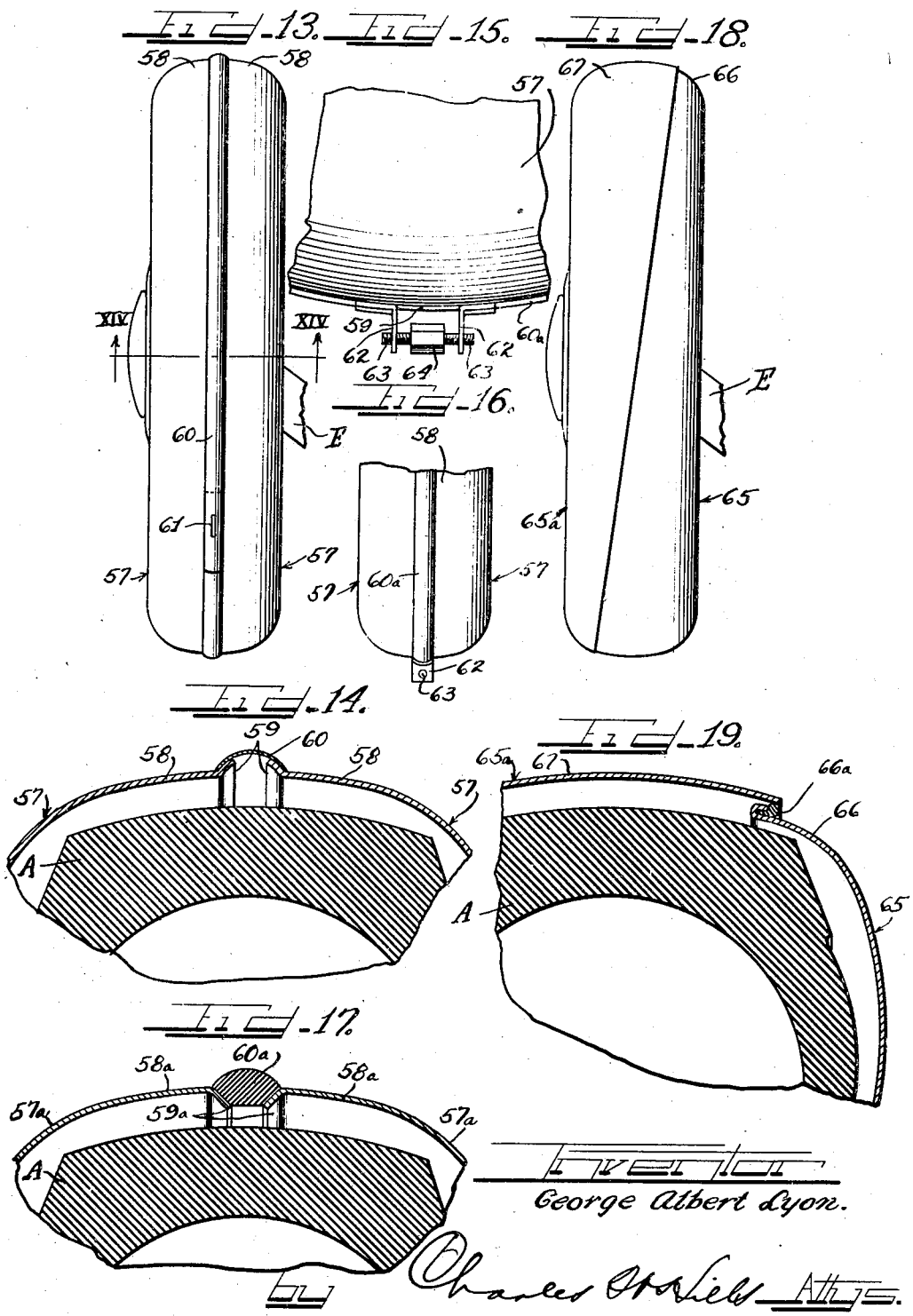

Feb. 14, 1939. G. A. LYON 2,147,049
SPARE WHEEL AND COVER ASSEMBLY
Original Filed Nov. 1, 1933 6 Sheets-Sheet 5
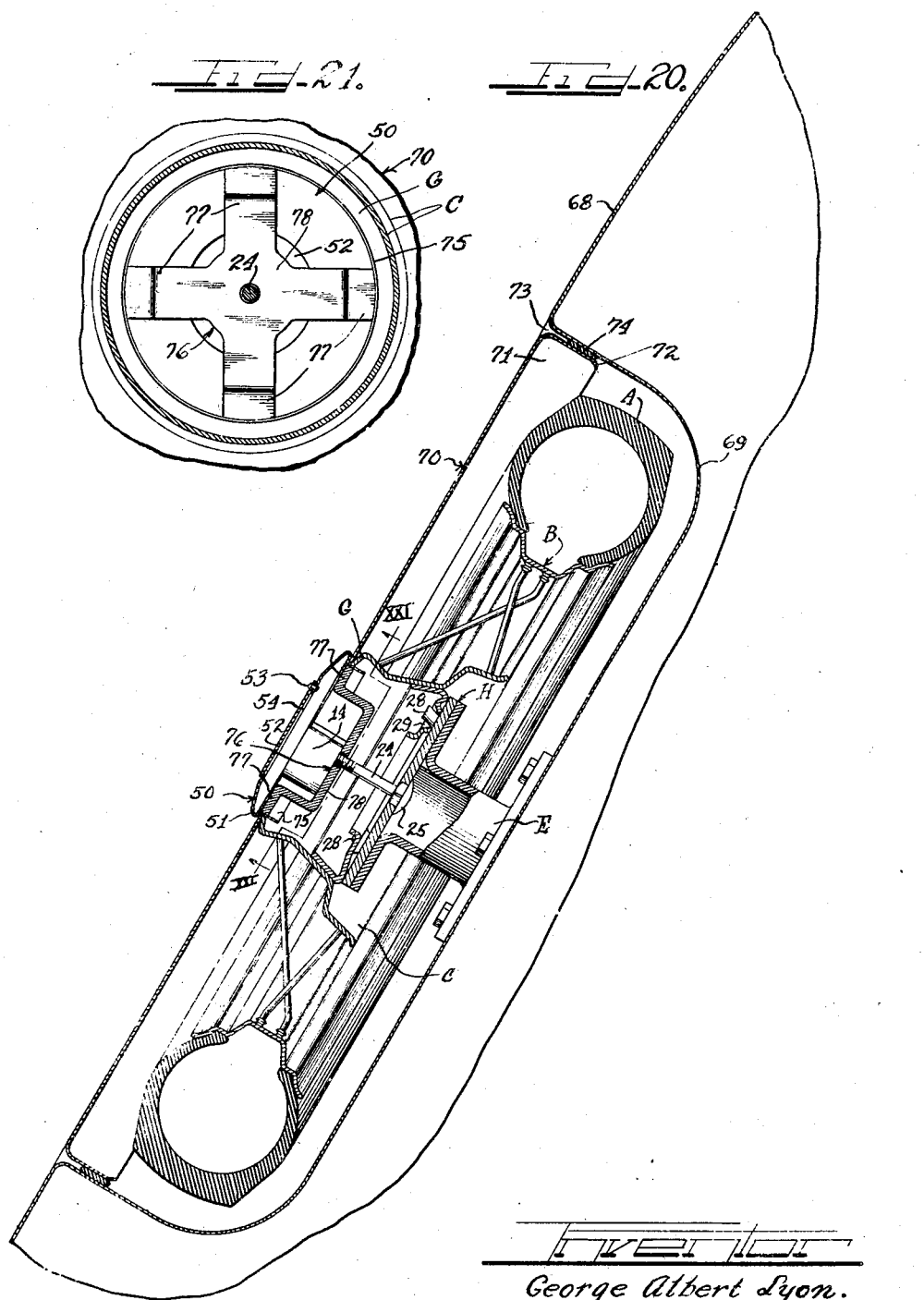
Inventor
George Albert Lyon.
by Charles W. Hills Attys.

Patented Feb. 14, 1939

2,147,049

UNITED STATES PATENT OFFICE 2,147,049

SPARE WHEEL AND COVER ASSEMBLY

George Albert Lyon, Allenhurst, N. J., assignor to Lyon Incorporated, Detroit, Mich., a corporation of Delaware Application November 1, 1933, Serial No. 696,224
Renewed December 30, 1936

6 Claims. (Cl. 150—54)

This invention has to do with covers for spare wheels and tires and is concerned more particularly with means for securely mounting a spare wheel on a carrier therefor and also for securing the cover in proper protecting relation with the spare wheel and tire.

It is an object of the invention to provide a device of this character embodying cooperating rotary and translatory instrumentalities for securing the cover in substantially coaxial relation to the spare tire and wheel.

It is another object of this invention to provide means of this character including theft-proof cooperating rotary and translatory elements for securing the cover in substantially coaxial relation with the spare tire and spare wheel and, at the same time, preventing unauthorized access to the wheel carrier.

It is a further object of the invention to provide a theft-proof means of this character carried entirely by the cover and including a nut lock device which is preferably key-controlled and removable to enable the theft-proof device to be unlocked.

It is another object of the invention to provide a spare wheel and tire carrier and cover assembly embodying substantially a single connection between the carrier and cover whereby to hold the cover, spare wheel and tire in proper cooperative relation to each other and to the carrier.

A further object of the invention resides in the provision of a spare wheel and tire cover and carrier assembly arranged to substantially completely cover the spare wheel and the tire, embodying substantially a single connection between the carrier and cover, and including means for preventing unauthorized access to the connection.

A further object of the invention contemplates the provision of means affording a single connection between the cover and carrier whereby to hold all of the parts in proper cooperating relation, together with instrumentalities independent of the connection for preventing unauthorized access to the connection.

Another object of the invention consists in the provision of a swingable closure and lock structure for the central part of the cover and cooperating with the spare wheel hub to prevent unauthorized access to the connecting means between the carrier and the cover.

It is further an object of the invention to provide, in a device of this character, a single connecting means between the cover and the carrier and including a preferably key-controlled means cooperating with the connecting means so as to prevent unauthorized access thereto.

The invention contemplates, as a further object, the provision of cover structure embodying complemental drum-like substantially semi-cover members arranged to cooperate with each other so as to substantially conceal the spare wheel and tire when assembled in proper relation to each other, said cover structure embodying a preferably permanent connection between one of the members and the spare wheel carrying means and a releasable connection between the other semi-cover and the spare wheel.

It is also an object of the invention to provide an improved spare wheel and tire supporting and covering structure arranged to be assembled with an automobile body so as to afford a substantially streamline effect.

In accordance with the general features of the invention, the spare wheel carrier and spare wheel may be provided with cooperating means accessible from the front of the wheel through the hub thereof, for mounting the wheel on the carrier. Such means may include fastening means or may include dowel-like anchor elements by which the wheel is supported from the carrier. Where the cover takes the form of a pair of complemental drum-like semi-cover members, the rear half may be substantially permanently connected to the carrier and the other half releasably connected to the carrier. The rear part of the cover may, if desired, constitute a recessed portion of the vehicle body in the event a streamline effect is desired.

In an embodiment wherein a cover for the rear side of the wheel is omitted, the cover employed may be connected through the spare wheel hub to the carrier or to the spare wheel hub independently of the carrier.

In the type of cover which substantially completely conceals the spare wheel and spare tire, embodying complemental semi-cover members, said members may be formed so as to overlap, or they may be formed so as to be spaced apart, and means such as a preferably ornamental spring split ring employed to bridge substantially all or a major portion of the gap.

Whatever form the invention may take, as hereinafter more specifically described, it will be evident that the structure is extremely simple, involves a minimum of parts which may be manufactured by simple operations and may be readily assembled, and which lends itself to easy manipulation so that the cover and spare wheel may be mounted and removed with a minimum of effort and yet, when the same are mounted, they are securely held in position against rattling.

Further objects and advantages of the invention will appear as the description proceeds.

The invention (in preferred forms) is illustrated in the drawings and hereinafter more fully described.

On the drawings:

Figure 1 is a fragmentary sectional view showing one form of the invention, certain parts being shown in elevation and certain parts being broken away for the sake of clarity.

Figure 2 is a fragmentary sectional view taken substantially as designated by the line II—II in Figure 1.

Figure 3 is a view similar to a portion of Figure 1 but showing a modified means for securing the cover in position.

Figure 4 is a view similar to Figure 1 but showing a modified form of the invention.

Figure 5 is a fragmentary sectional view taken substantially as designated by the line V—V in Figure 4.

Figure 6 is a fragmentary sectional view taken substantially as designated by the line VI—VI in Figure 4.

Figure 7 is a view similar to Figure 1 but showing a further modified form of the invention.

Figure 8 is a fragmentary sectional view taken substantially in the plane designated by the line VIII—VIII in Figure 7.

Figure 9 is a fragmentary sectional view taken substantially as designated by the line IX—IX in Figure 7, certain parts being shown for convenience in elevation.

Figure 10 is a view similar to Figure 1 but showing another modified form of the invention.

Figure 11 is a fragmentary sectional view taken substantially as designated by the line XI—XI in Figure 10.

Figure 12 is a fragmentary front elevation of the central portion of the structure of the cover shown in Figure 10.

Figure 13 is a side elevation of a cover construction which could be employed in place of those shown in connection with the other forms of the invention.

Figure 14 is an enlarged fragmentary sectional view taken substantially as designated by the line XIV—XIV in Figure 13.

Figure 15 is a fragmentary elevational view of a somewhat modified form of the cover structure shown in Figure 13.

Figure 16 is a fragmentary elevational view of the structure shown in Figure 15 and taken at right angles thereto.

Figure 17 is a view similar to Figure 14 but showing a modified form of cover construction.

Figure 18 is a view similar to Figure 13 showing a further modified form of cover construction.

Figure 19 is an enlarged fragmentary sectional view taken at the upper part of Figure 18.

Figure 20 is a fragmentary sectional view of a still further modified form of carrier, spare wheel, cover and automobile body construction affording a streamline effect.

Figure 21 is a fragmentary enlarged sectional view taken substantially as designated by the line XXI in Figure 20.

Referring now more particularly to the drawings, there is illustrated in Figure 1 a spare tire A mounted on a spare wheel B provided with a hub C removably bolted at D to a carrier E which is preferably permanently secured to any suitable part of an automobile body, either at the rear or in conjunction with a well at the side or elsewhere, such as a fender well. When so mounted, the spare wheel and tire may be removed by the insertion of a wrench through the front opening F in the front wall G of the hub C and removal therewith of the nuts of the bolt structures D.

The cover for the spare wheel and tire may take any desired form as shown in the various figures of the drawings. One form for illustrative purposes is shown in Figure 1 as embodying a substantially one-piece drum-like member 1 having a rim portion arranged to extend substantially entirely across and thus cover the tread of the tire A, and preferably of such diameter as to enable said rim portion to accommodate tires of different diameters. When employed in conjunction with a spare wheel carried independently of a well such as a fender well, the rim portion may be continuous so as to extend entirely around the entire tread. When employed in conjunction with a spare wheel mounted in a well, such as a fender well, the rim portion may be of such form as to cover substantially the entire portion of the tire tread which is exposed above the well. The cover 1 is formed with a substantially plate-like side portion 2 extending inwardly from the rim portion and formed in cross-section to substantially simulate the cross-sectional contour of the front wall of the tire and the front side of the spare wheel. The plate-like portion 2 is formed with a substantially centrally located rearwardly depressed cup-like boss 3 which is preferably, though not necessarily, circular, the bottom 4 being preferably reinforced by a plate 5 which may be welded, riveted or otherwise suitably secured thereto. The size of the boss 3 is preferably such as to fit into the mouth F with a substantial degree of clearance as shown and to preferably project into the hub C when the plate-like portion 2 is engaged with the front or outer wall of the spare tire as at 6. The shape of the portion 2 at 6 is such as to enable the portion 2 to engage the tire inwardly of the portion of the tire of maximum width, so that the part 6 serves as a means for centering the cover 1 with respect to the spare tire A and consequently with the spare wheel B.

The plate 5 carries a plurality of guide elements such as the pins 7 preferably arranged equidistant from the center of the plate 5 and part 3. Three pins 7 are illustrated, but it will be appreciated that any suitable number may be employed for the purpose to be now described. A bolt 8 is arranged with its shank extending rearwardly through the plate 5 and bottom 4 of the boss 3 so as to be received by and threaded to a sleeve 9 forming the body of a spider including three legs 10 riveted or otherwise suitably secured at 11 to the body. The sleeve or body 9 is formed with perforations through which the guide pins 7 protrude, said pins thus preventing rotary but permitting translatory or axial movement relative to the bolt 8.

The head of the bolt is formed so as to be rotated by means of a wrench and includes spaced wrench engaging portions 12 affording an intermediate annular recess 13. A bolt lock device 14 affording a housing for the head of the bolt 8 and providing sufficient clearance to enable the housing to be rotated about the bolt head. Said device is provided with a preferably key-controlled latch or plunger 15 which has its rear outer end beveled so as to be cammed outwardly by the beveled forward extremity 16 of the bolt head as the device 14 is forced rearwardly over the bolt head. A spring 16a mounted in the forward end of the housing is arranged to yieldably resist telescoping movement of the device 14 relative to the bolt head and to yieldably hold the latch 15 in engagement with the front lateral wall of the circumferential groove 13 after said latch has been snapped by the lock mechanism into said groove to the position shown in Figure 1. The device 14 may be varied in its details so long as it performs the function described. By inserting the proper key in the device 14, the latch 15 may be retracted sufficiently to enable the device 14 to be removed and allow the application of a wrench to the portions 12 in order to cause translatory movement of the sleeve or head 9.

The legs 10 are preferably identical with each other and spaced equally from each other and equally from the center of the sleeve 9. The legs 10 are formed of resilient material such as spring steel. Each leg in the illustrated form constitutes substantially a leaf spring bent so as to extend substantially radially outwardly and rearwardly and then inwardly and forwardly to afford a substantially hook-like structure with its free end portion preferably inclined to the axis of the cover as shown at 16. The dotted line showing of one of the legs 10 in Figure 1 illustrates the shape and arrangement of the leg 10 when unstressed. In Figure 1, the legs 10 are arranged in full lines in their spread-out condition. This is caused by rotation of the bolt 8 in a direction to draw the head or sleeve 9 forwardly, thereby causing the ends 16 to engage the corner 17 of the boss 3 and be cammed outwardly thereby, until the legs 10 project outwardly substantially beyond the mouth F and within the hub C. Thus the legs 10 serve as latches or retainers which, when the device 14 is locked on the bolt head, effectively and positively prevent removal of the cover 1.

Since access to the wheel mounting bolt means D can be had only through the mouth F of the hub C, it will be understood that when the cover 1 is locked as shown in Figure 1, access to the bolt means D is prevented so that the means for locking the cover serves also as a means for locking the space wheel and tire on the carrier E.

A dust excluding cap 18 is preferably hinged at 19 to the side plate 2, a spring 20 being employed preferably at the pivot so as to yieldably hold the cap 18 in the position desired. The cap 18 is preferably provided with a tab 21 to enable the cap 18 to be readily grasped.

The form of the invention shown in Figure 3 is substantially identical with the securing means of Figure 1 except that the locking device 14 is omitted and the bolt 8a, instead of being provided with wrench engaging portions 12, is provided with an elongated handle 22 or thumb grip so as to enable the bolt 8a to be rotated by hand.

In the form of the invention shown in Figures 4, 5 and 6, the wheel B is substantially identical with that of Figs. 1, 2 and 3. However, the cover structure and securing means of Figures 4, 5 and 6 are different and will now be described.

The cover is of the two-part type embodying front and rear drum-like members 22 and 23 respectively, shaped in cross-section to simulate generally the transverse sectional contour of the spare wheel and tire. The front member 22 is formed with a rim portion to substantially cover the entire tread of the tire and extending rearwardly sufficiently to overlap the return bent margin of the rear member 23. The rear member 23 at its central portion is bulged forwardly so as to project into the hub C when the wheel is properly mounted, and be sandwiched between flange portions H at the forward end of the carrier E. Said portions and member 23 are preferably permanently connected together as by welding or the like.

A bolt 24 has its head 25 preferably permanently secured to the carrier E so as to extend substantially axially of the cover and wheel forwardly within the hub C. The front cover member 22 is formed substantially centrally with a rearwardly depressed boss 26 of such dimensions as to readily pass rearwardly into the hub C. The boss 26 is preferably round and of such size as to clear the mouth of the hub C without difficulty, yet fit therein so as to be substantially centered with respect to the hub C. The boss 26 is provided with a preferably central opening through which the bolt 24 is arranged to extend forwardly when the cover member 22 is in proper covering position, a lock washer and nut 27 completing the bolt assembly within the boss 26 and serving to urge the same rearwardly so as to clamp the portion of the cover member 22 adjacent the boss 26 against the front wall G of the hub C.

Securely mounted on the carrier E and extending forwardly thereof are a plurality of supporting pins 28 arranged to be aligned with corresponding openings 29 in the hub C. The number of openings in the hub may be varied, five being illustrated. These openings are formed so as to receive the bolts by which the wheel may be attached to an axle of the car for supporting the same. The number of pins 28 may correspond to the number of openings 29 although that it is not essential and in fact in the present illustration there are provided three pins, two of which are in adjacent openings 29 and the third of which is in a substantially diametrically opposed third opening 29.

The pins 28 preferably extend upward at an angle to the axis of the wheel, and by virtue of the arrangement of the pins in correspondence with the openings of the hub C, and the fact that the openings 29 are readily visible through the front opening in the hub, said openings may be readily aligned with the forward ends of the pins 28 so as to readily receive the same and be mounted thereon as shown in Figures 4 and 5. The pins 28 serve substantially as hooks which not only support the spare wheel and tire vertically, or in the plane of the wheel and tire, but afford also lateral support preventing the wheel from slipping up the pins prior to application of the clamping nut 27 to the bolt 24.

The front cover member 22 is provided with a cap 30 preferably hinged thereto at 31 and provided with a peripheral neck 32 arranged to fit within the mouth of the boss 26. At a marginal portion of the cap 30 preferably diametrically opposite the hinge 31, the cap has securely fastened thereto as by spot-welding or the like, a lock device 33 preferably key-operated and provided with a plunger or latch 34 whose rear outer end portion is beveled so as to enable the same to be cammed inwardly by the rim 35 of the boss 26 as the cap 30 is swung to closing position. As the cap 30 is continued in its rearward swinging movement, the plunger 34 is held by the peripheral wall of the boss 26 in its retracted position until an opening 36 in said wall is reached, whereupon the plunger 34 is snapped outwardly into said opening and beyond said wall so as to engage the rear surface of the front wall G of the hub C as shown in Figure 4. The plunger 34 may be withdrawn manually by inserting the proper key in the key hole 37.

It is thus apparent that the spare wheel, spare tire and front cover member 22 may be securely mounted against rattling on the carrier E in such a manner as to render the same theft-proof.

A somewhat modified form of the construction shown in Figures 4, 5 and 6 appears in Figures 7, 8 and 9. In this modified form of the invention, the rear cover member may be employed but for illustrative purposes is omitted, the sole covering instrumentality comprising substantially the front cover member 22. Welded or brazed, or otherwise preferably permanently secured in coaxial relation to the attaching flange structure H of the carrier E is a threaded sleeve 38 conically countersunk at its free end at 39 to readily guide the threaded end of the cap screw or bolt 40 thereinto. The adjacent portion of the flange structure H may, if desired, also be threaded in continuation of the thread of the sleeve or nut 38. The screw 40 passes rearwardly through a central opening in the boss 26 of the cover member 22, a lock washer being positioned between the bottom of the boss 26 and the head 41 of the screw. After the head 41 is tightened to the desired degree so as to prevent rattling between the carrier, wheel and cover, a hub cap 42 for the wheel having preferably a plurality of spring detents 43 arranged to project outwardly beyond the collar 44 of the cap is forced rearwardly in coaxial relation with the cover member 22 until the latches 43 snap into the openings 36a provided in the peripheral wall of the boss 26 of the cover member 22 for that purpose.

The flange structure H is provided with upwardly inclined pins 28 extending forwardly and upwardly through corresponding openings 29 in the hub C and cooperating in exactly the same manner in which the parts were described to cooperate in connection with Figures 4, 5 and 6.

The connection afforded by the employment of the spring detents 43 serves to prevent rattling between the cap 42 and the cover member 22 and hub C.

In Figures 10, 11 and 12, a still further modified form of the invention is shown. The cover structure may be varied as desired but, for illustrative purposes only, is shown in this modification to comprise a pair of parts embodying a drum-like side plate 44 for covering substantially the entire front side of the spare wheel B and spare tire A, and a preferably resilient split rim member 45 of the Lyon type, the rim member, by virtue of its resilience, serving to hug the tire and to overlap and cause the side plate member 44 also to hub the tire at its outer peripheral portion so that both parts of the cover are held in substantially coaxial relation to the spare wheel and tire, and so as not to rattle with respect to each other or with respect to the tire. The anti-rattling strip 46 of rubber or the like carried by the outer margin of the member 44 engages the rim member 45 for this purpose, preventing metal to metal contact between said members.

As in the last two forms of the invention previously described, the mounting flange H of the carrier E is provided with upwardly inclined supporting pins 28 adapted to extend through corresponding openings 29 in the spare wheel hub C to support the spare wheel B, and as in Figures 4, 5 and 6, the bolt 24 extends forwardly from the carrier E in substantially coaxial relation to the spare wheel B when the same is mounted on the carrier E, the head 25 of the bolt being swaged, welded, brazed or otherwise suitably preferably permanently connected to the carrier E.

The cover member 44 is formed substantially centrally with a hollow rearwardly extending boss 46 which may be of a diameter appreciably less than the diameter of the mouth F of the front wall G of the hub C, so as to clearly fit therein. For the purpose of reinforcing the base of the boss 46 as well as to assist in holding the cover member 44 in substantially coaxial relation to the spare wheel B, a spider structure is provided comprising a body 47 and arms 48. The number of arms 48 may of course be varied, three being here employed for illustrative purposes only. The body 47 and arms 48 adjacent the body extend substantially at right angles to the axis of the boss and rearwardly of the same, and are brazed, welded, riveted, or otherwise suitably preferably permanently connected to the base of the boss 46. The arms are bent forwardly so as to extend substantially parallel to the axis of the boss 46 adjacent their outer ends, at such a distance from the center of the body 47 as to enable said arms to snugly fit in the mouth F of the hub C. It will of course be understood that suitable clearance will be allowed to compensate for slight discrepancies in manufacture, and to enable the spider to readily fit without difficulty in the mouth F. The arms 48 at their outer extremities 49 extend laterally so as to be interposed between the cover member 44 and the front wall G of the hub C. If desired, said extremities may be welded or otherwise suitably fastened to the cover member 44.

The boss 46 and spider body 47 are provided with registering central openings through which the shank of the bolt 24 extends forwardly, the end of the bolt 24 being threaded and receiving a nut of substantially the same construction as the bolt head illustrated in Figure 1. The nut 24a is thus provided with spaced wrench engaging portions 12a and an intermediate annular groove 13a for cooperating with the locking device 14 in the manner previously described.

Once the nut is tightened to the desired degree, it is clear that rattling will be prevented and at the same time the spare wheel, spare tire and cover member 44 will be securely held in proper cooperative relation. When the locking device is applied, the whole comprising the spare wheel, spare tire and cover member 44 are securely locked to the carrier E.

A cap structure for protecting the instrumentalities located in the boss 46 from dust and the like may be provided as shown at 50. This structure embodies a hollow member 51 having an inturned marginal edge which may be spot welded, riveted or otherwise suitably secured to the cover member 44 in substantially coaxial relation thereto. A closure 52 is hinged to the part 51 at 53 so as to swing, the part 51 being provided with a central opening 54 rendering the interior of the boss 46 accessible for the application of a key to the key hole 55 of the lock device 14 and the application of a wrench to the portions 12a of the nut. The closure 52 may be swung into closed position as shown in Figure 10 or to open position as shown in Figure 12, and to facilitate engagement therewith for moving the same, the closure is provided with a finger grip or tab 56.

In Figures 13 and 14 is illustrated a modified form of tire cover which could, for example, be employed in place of the cover structure shown in Figure 4. The cover structure of Figures 13 and 14 embodies half cover members 57 each having a rim portion 58 arranged to cover slightly less than one-half the tread of the tire A so as to leave a gap therebetween at substantially the median plane of the tire. The rim portions 58 at their margins are bent outwardly at 59 to provide anchoring flanges for retaining a resilient filler strip 60 which bridges the gap between the portions 58. The strip 60 is preferably concavo-convex in cross-section and arranged with its convex surface outermost so as to give the impression that the portions 58 and part 60 are integral. The part 60 is preferably of generally arcuate form and of substantially more than 360° in extent and is resilient so as to hug the flange portions 59 and thereby hold itself thereon. A finger gripping hook or ring 61 may be applied adjacent either or both ends of the strip 60 to enable one manipulating the structure to readily grasp and apply or remove, as the case may be, the strip 60.

A somewhat modified strip structure is shown in Figures 15 and 16, wherein the strip 60a is nearly 360° in extent and is provided at its ends with brackets 62 which are oppositely threaded to receive the oppositely threaded shanks 63 of a turnbuckle 64, whereby the strip 60a may be expanded to enable the same to be applied to and removed from cooperative relation with the cover members 57 and may be contracted so that the same will be held in said position.

Figure 17 shows a somewhat modified cover and strip structure. The cover members 57a have their rim portions 58a provided with inwardly bent flanges 59a, providing a transversely tapered longitudinally annular pocket in which a correspondingly shaped, outwardly convex resilient strip 60a is received. If desired, the strip 60a may be made of rubber or other suitable material having the desired resilient characteristics. The strip 60a is so formed preferably as to conceal the peripheral pocket and the gap between the cover members 57a, and may be formed with handle or finger grip means 61 as in Figure 13 or with adjusting means such as shown in Figures 15 and 16.

A further modified cover construction is shown in Figures 18 and 19, wherein the cover halves 65 are formed so that the plane of the outer margin of each is inclined to the axis thereof. The cover members 65 and 65a are formed so that the front member preferably may be arranged to overlap the rear member as clearly shown in Figure 19. The rear cover member 65 is preferably secured to the carrier E so that the shallowest portion 66 thereof is uppermost and it is obvious that when the front cover member 65a is mounted in position, the deepest portion 67 will be located uppermost so as to insure the front member's overlapping the rear member substantially throughout. This arrangement will substantially preclude entry of foreign matter between the members. Suitable cushioning means 66a may be provided between the overlapped margins of the members 65 and 65a to inhibit rattling therebetween.

A further modified form of tire cover structure is shown in Figure 20, for affording a streamline effect in conjunction with an automobile body.

The body 68 at the rear or elsewhere may be inclined or otherwise located and provided with a depressed portion 69 of such depth as to house the spare wheel B, spare tire A, and front cover member 70 and to cooperate with the latter in substantially completely enclosing the spare wheel and tire. Preferably, the depth of the depressed portion 69 is such that when the cover member 70 is engaged with the front wall G of the hub C, the outer surface of the cover member 70 is substantially flush with and constitutes substantially a continuation of the outer surface of the body 68 of the vehicle.

The outer cover member 70 is formed with a collar 71 extending at its outer margin so as to telescope the depressed portion 69 and the edge portion of the collar 71 is preferably turned inwardly at 72 to assist in centering and guiding the cover member 70 as it is moved into telescoped relation to the depressed portion 69. The portion 69 is formed adjacent its mouth 73 with a strip of anti-rattling means, such as felt, rubber or the like 74, and the turned edge 72 will slide over the same when the cover parts are assembled in telescoped relation.

The outer cover member 70 is provided with a substantially central opening bounded by a flange 75 extending in the same direction as the collar 71 and of such diameter as to fit the mouth of the wall G of the hub C.

The opening in the cover member 70 is provided for the reception of a spider 76 whose arms 77 fit in the flange 75 and which provides a clamp base 78 for receiving the clamping nut on the threaded end of the connecting bolt 24. The arms 77 are fastened by spot-welding or the like to a closure device 50 such as is shown in Figure 10. The device 50 is spot welded or otherwise suitably secured to the cover member 70 adjacent its central opening so that the cover member 70, closure device 50 and spider 76 constitute in effect a unitary structure.

The shank of the bolt 24, whose head 25 is permanently fastened to the flange structure H of the carrier E is arranged to project through the spider 76 to be threaded into a clamping nut, access to which by an unauthorized person may be prevented by the employment of a locking device 14 as heretofore described.

In applying the cover member 70, the latter may, if desired, be positioned at an angle to the body 68 so as to substantially rest upon the lower part of the band 74, and thereafter swung about the supported part as a pivot substantially to the position shown in Figure 20.

The spider 76 is preferably of substantially thicker gage material than the sheet material such as sheet metal employed in the construction of the tire cover member 70 and closure device 50, so as to withstand the clamping pressure and relieving the parts 70 and 50 of the clamping stresses.

It will be seen by the foregoing that the invention is of such character as to enable the same to be practiced with a variety of modifications of tire cover constructions, and involves an improved mounting structure for the spare wheel and cover instrumentalities, enabling the same to be assembled on and removed from the spare wheel carrier without difficulty and with dispatch, and may be effectively employed in conjunction with or independently of a well such as a fender well. The parts are simple, involving easy manufacturing operations at low cost, and the exposed parts lend themselves to any desired ornamentation. The closures arranged at the central portions of the outer or front cover members may, if desired, constitute name plates, either of the manufacturer or owner of the vehicle, if desired.

It will be clear from the foregoing that the lock device 14 is freely rotatable about the part locked thereby so that when the device is in locked relationship to said part, rotation of the device will not result in rotation of the part locked.

The strip 60a is more than 180° in extent and may be split or endless, as desired. It may be of substantially form-retaining material so that it may be snapped into place after the cover members are assembled, and if made of collapsible material, it may be snapped into place even if made endless. It is not necessary, however, to mount the strip 60a by snapping, since the strip may be placed in position so as to engage the margin of the rear cover member before the front member is applied. After the front member is applied, it will be held by any of the instrumentalities hereinabove described in cooperative relation with the spare wheel and will thus hold the strip in place.

I am aware that many changes may be made and numerous details of construction may be varied through a wide range without departing from the principles of this invention, and I, therefore, do not purpose limiting the patent granted hereon, otherwise than is necessitated by the prior art.

I claim as my invention:

1. In combination with a spare wheel and tire cover and a spare wheel support having means accessible from the front through the wheel hub for mounting the wheel: means carried by the cover for mounting the cover so as to prevent unauthorized access to the first means, the second means comprising a threaded member arranged to translate substantially axially of but not rotate relative to the cover, radially expansible and contractible resilient means carried by said member and arranged to pass freely into the hub as the cover is placed in operative position, a rotary threaded element cooperating with said member so as to translate the same, and abutment means in the path of forward movement of said resilient means to cam the same outwardly so as to project the same behind the front wall of the hub, and instrumentalities for preventing unauthorized rotation of said element.

2. In combination with a spare wheel and tire cover and a spare wheel support having means accessible from the front through the wheel hub for mounting the wheel: means carried by the cover for mounting the cover so as to prevent unauthorized access to the first means, the second means comprising a threaded member arranged to translate substantially axially of but not rotate relative to the cover, radially expansible and contractible resilient means carried by said member and arranged to pass freely into the hub as the cover is placed in operative position, a rotary threaded element cooperating with said member so as to translate the same, and abutment means in the path of forward movement of said resilient means to cam the same outwardly so as to project the same behind the front wall of the hub, and key-controlled instrumentalities for preventing unauthorized rotation of said element.

3. In combination with a tired spare wheel having an enlarged hub opening and a tire cover therefor: means carried by the cover for mounting the cover on the wheel, said means comprising a threaded member arranged to translate substantially axially of but not rotate relative to the cover, radially expansible and contractible resilient means carried by said member and arranged to pass freely into the opening as the cover is placed in operative position, a rotary threaded element cooperating with said member so as to translate the same, and abutment means in the path of forward movement of said resilient means to cam the same outwardly so as to project in the larger part of the opening.

4. In combination with a tired spare wheel having an enlarged hub opening and a tire cover therefor: means carried by the cover for mounting the cover on the wheel, said means comprising a threaded member arranged to translate substantially axially of but not rotate relative to the cover, radially expansible and contractible resilient means carried by said member and arranged to pass freely into the opening as the cover is placed in operative position, a rotary threaded element cooperating with said member so as to translate the same, and abutment means in the path of forward movement of said resilient means in the path of forward movement of said resilient means to cam the same outwardly so as to project in the larger part of the opening, and a handle carried by said element to enable the same to be readily rotated.

5. In combination with a spare wheel and tire cover and a spare wheel support having means accessible from the front through the wheel hub for mounting the wheel: means carried by the cover for mounting the cover so as to prevent unauthorized access to the first means, the second means comprising a threaded member arranged to translate substantially axially of but not rotate relative to the cover, radially expansible and contractible resilient means carried by said member and arranged to pass freely into the hub as the cover is placed in operative position, a rotary threaded element cooperating with said member so as to translate the same, and abutment means in the path of forward movement of said resilient means to cam the same outwardly so as to project the same behind the front wall of the hub, and instrumentalities for preventing unauthorized rotation of said element, said member being disposed so as to be inaccessible from the front of the cover except by means of said element.

6. In combination with a spare wheel and tire cover and a spare wheel support having means accessible from the front through the wheel hub for mounting the wheel: means carried by the cover for mounting the cover so as to prevent unauthorized access to the first means, the second means comprising a threaded member arranged to translate substantially axially of but not rotate relative to the cover, radially expansible and contractible resilient means carried by said member and arranged to pass freely into the hub as the cover is placed in operative position, a rotary threaded element cooperating with said member so as to translate the same, and abutment means in the path of forward movement of said resilient means to cam the same outwardly so as to project the same behind the front wall of the hub, and instrumentalities for preventing unauthorized rotation of said element, said second means being independent of the wheel mounting means.

GEORGE ALBERT LYON.